United States Patent [19]
Nakajima et al.

[11] Patent Number: 5,757,734
[45] Date of Patent: May 26, 1998

[54] MAGNETO-OPTICAL RECORDING MEDIUM AND METHOD FOR REPRODUCING FROM SAME

[75] Inventors: Junsaku Nakajima, Kashihara; Junji Hirokane, Nara; Yoshiteru Murakami, Nishinomiya; Akira Takahashi, Nara, all of Japan

[73] Assignee: Sharp Kabushiki Kaisha, Osaka, Japan

[21] Appl. No.: 668,429

[22] Filed: Jun. 17, 1996

[30] Foreign Application Priority Data

Jul. 7, 1995 [JP] Japan ................. 7-172538

[51] Int. Cl.$^6$ ............. G11B 11/00; G11B 5/66
[52] U.S. Cl. ................. 369/13; 428/694 EC
[58] Field of Search ............ 369/13, 275.1, 369/275.2, 275.3, 59, 116, 121, 122, 124, 112, 14, 110, 288; 360/114, 59; 428/694 ML, 694 EC, 694 MM, 694 RE

[56] References Cited

U.S. PATENT DOCUMENTS

| | | | |
|---|---|---|---|
| 5,283,770 | 2/1994 | Nakao et al. | 369/13 |
| 5,604,046 | 2/1997 | Osato | 428/694 ML |
| 5,648,162 | 7/1997 | Hirokane et al. | 428/332 |
| 5,657,299 | 8/1997 | Nakajima et al. | 369/13 |

OTHER PUBLICATIONS

"Multilayered Magneto-Optical Disks for Magnetically Induced Superresolution" (M. Kaneko et al., Jpn. J. Appl. Phys. vol. 31 (1992) pp. 568–575 Part 1, No. 2B, Feb. 1992).

"Magnetically-Induced Super Resolution Using Magneto-Static Coupling" (K. Tamanoi et al., Proceedings of Magneto-Optical Recording International Symposium '94, J. Magn Soc. Jpn., vol. 19, Supplement No. S1 (1995), pp. 421–424).

Heisei, "Double-Sided Magneto-Optical Recording Medium Capable of Over-Writing and Production Thereof", Japanese Laid-Open Patent Publication, No. 6-338083, Published on Dec. 6, 1994.

*Primary Examiner*—Ali Neyzari
*Attorney, Agent, or Firm*—David G. Conlin; William J. Daley, Jr.

[57] ABSTRACT

A magneto-optical recording medium is composed of a reproducing layer, a recording layer, and an initializing layer, which are laminated in this order. The reproducing layer is provided so that a light beam is projected thereon so as to reproduce information. The recording layer is provided so that information is recorded therein and the information is copied to the reproducing layer at a readout temperature. The initializing layer is provided so that the reproducing layer is initialized at room temperature. Non-magnetic layers are provided between the reproducing layer and the recording layer and between the recording layer and the initializing layer, respectively, so that such two layers are not exchange-coupled each other. The recording layer has a compensation temperature of room temperature, while the initializing layer has a compensation temperature of the readout temperature, which is achieved by temperature rise caused by the projection of the light beam. With such an arrangement, an external magnetic field for initializing the reproducing layer and an external magnetic field for reproduction-use can be omitted, thereby preventing a recording device from becoming large in size, as well as enhancing the recording density of the recording layer.

8 Claims, 8 Drawing Sheets

MAGNETO-OPTICAL RECORDING MEDIUM AND METHOD FOR REPRODUCING FROM SAME

FIELD OF THE INVENTION

The present invention relates to a magneto-optical recording medium for use with a magneto-optical recording and reproducing device, such as a magneto-optical disk, a magneto-optical tape, and a magneto-optical card, as well as to a method for reproducing from the same.

BACKGROUND OF THE INVENTION

Conventionally, a magneto-optical disk memory has been used as a rewritable magneto-optical recording medium in its practical application. Such magneto-optical disk memory has such a drawback that when a diameter of a recording bit forming a recording magnetic domain and an interval between the recording bits are smaller with respect to a diameter of the light beam from a semiconductor laser converged on the magneto-optical disk, reproducing characteristics deteriorate.

The described problem stems from that a light spot of the laser beam which is converged on a target recording bit also falls on an adjacent recording bit, thereby being unable to reproducing each recording bit separately.

In order to counteract the above-mentioned problem, two methods called FAD (Front Aperture Detection) and RAD (Rear Aperture Detection) are proposed in Japan Journal of Applied Physics Vol. 31 (1992, pp. 568–575), and it discloses that recording density on the disk is enhanced utilizing the two methods.

FAD is a method presented as follows. Since the rear portion of a beam spot formed on the reproducing layer by the projection of a laser beam is heated higher than the other portions, the coercive force of the reproducing layer in the rear portion becomes smaller due to the temperature rise. As a result, the magnetization of the reproducing layer in the rear portion is directed in one specific direction by a reproduction-use external magnetic field, thereby masking the magnetization direction of a recording layer in the rear portion. Accordingly, the information recorded in the recording layer in the front portion of the beam spot is alone read out through the intermediary of the reproducing layer. Thus, it is possible to read out even a recording bit smaller than the beam spot. This leads to the enhancement of recording density of the recording layer.

RAD is a method presented as follows. The magnetization direction of a reproducing layer is previously initialized by an initialization-use external magnetic field, thereby masking the magnetization direction of a recording layer. When the light beam is projected on the reproducing layer, only the magnetization directions of the recording layer corresponding to the higher-temperature portion, i.e., rear portion, of the beam spot become unmasked, thereby ensuring to read out the magnetization direction of the recording layer as information through the intermediary of the reproducing layer. Thus, it is possible to read out even a recording bit smaller than the beam spot. This leads to the enhancement of recording density of the recording layer.

However, the foregoing conventional FAD method has a problem as follows. According to the FAD method, a readout region is formed in a crescent shape arcing in the radial direction of the disk in accordance with the temperature distribution caused on the medium in a readout operation. When tracks whose interval is narrow are formed, a target recording bit is reproduced together with a recording bit on the adjacent track. Therefore, the recording density in a track direction (recording density in the radial direction of the disk) can hardly be improved.

The above-mentioned methods also have a problem that a reproducing device tends to be bulky and that consumed power increases, since each method requires an external magnetic field when reproducing.

SUMMARY OF THE INVENTION

The object of the present invention is to provide a magneto-optical recording medium and a method for reproducing from the same, which do not require an external magnetic field when reproducing, thereby avoiding the bulking up of a reproducing device, and ensure higher recording density.

To achieve the described object, a first magneto-optical recording medium in accordance with the present invention comprises (1) a reproducing layer, (2) a recording layer, and (3) an initializing layer formed in this order on a transparent substrate. The respective reproduction, recording and initializing layers are made of magnetic substances, each of which has perpendicular magnetization and is made of a rare earth-transition metal alloy. The magneto-optical recording medium also comprises (4) a first non-magnetic layer provided between the reproducing layer and the recording layer. The first non-magnetic layer is provided so as to intercept affection of an exchange-coupling force between the reproducing layer and the recording layer, which are made of rare earth-transition metal alloys. The magneto-optical recording medium further comprises (5) a second non-magnetic layer provided between the recording layer and the initializing layer. The second non-magnetic layer is provided so as to intercept affection of an exchange-coupling force between the recording layer and the initializing layer, which are made of rare earth-transition metal alloys. The above-described magneto-optical recording medium is characterized as follows. The reproducing layer has a coercive force which is always smaller than a total leakage magnetic field induced in the reproducing layer, which is obtained by summing leakage magnetic fields from the recording layer and the initializing layer respectively when temperature falls in a range between room temperature and a readout temperature. The readout temperature is obtained by the projection of a laser beam on the reproducing layer so that information is read out from the reproducing layer in accordance with a direction of the perpendicular magnetization. The recording layer has a coercive force which is always greater than a total leakage magnetic field induced in the recording layer, which is obtained by summing leakage magnetic fields from the reproducing layer and the initializing layer respectively in the temperature range. The respective leakage magnetic fields induced in the reproducing layer by the recording layer and the initializing layer change depending on respective saturation magnetizations of the recording layer and the initializing layer, the saturation magnetization changing in accordance with a temperature change. The leakage magnetic field from the initializing layer is greater than that from the recording layer in a temperature range from room temperature to the vicinity of the readout temperature, whereas the leakage magnetic field from the recording layer is greater than that from the initializing layer at the readout temperature.

According to the described arrangement, the first and second non-magnetic layers intercept the exchange-coupling force exerting between the reproducing layer and the recording layer, and that between the recording layer and the initializing layer, respectively. Therefore, it is avoidable that the magnetization of the reproducing layer is directed in the magnetization direction of the recording layer or that of the initializing layer by means of the exchange-coupling force, although the coercive force of the reproducing layer is set small.

In accordance with the above arrangement, as to the leakage magnetic field induced in the reproducing layer, which is obtained by summing the leakage magnetic fields from the recording and initializing layers, the leakage magnetic field from the initializing layer is predominant at room temperature, and its strength is greater than that of the coercive force of the reproducing layer. Therefore, the magnetization of the reproducing layer is directed in the magnetization direction of the initializing layer.

On the other hand, when temperature rises due to the projection of the laser beam, at a portion which is heated at or above a predetermined temperature (the readout temperature), the leakage magnetic field from the recording layer is predominant, and its strength is greater than the coercive force of the reproducing layer. Therefore, the magnetization of the reproducing layer is directed in the magnetization direction of the recording layer.

In short, at a high temperature region, i.e., a region heated by the laser beam at or above the readout temperature, information in the recording layer is copied to the reproducing layer by means of magnetostatic force. On the other hand, at a low temperature region, i.e., a region heated in the temperature range at or above room temperature and below the readout temperature, the information in the initializing layer is copied to the reproducing layer, namely, the reproducing layer is initialized.

With the foregoing arrangement, it is avoidable that information in the recording layer is rewritten by the affection of the reproducing layer or the initializing layer in the temperature range between room temperature and the readout temperature, since the coercive force of the recording layer is greater than leakage magnetic field induced in the recording layer, which is caused by the magnetic flux leaked from the reproducing layer and the initializing layer in the above temperature range.

Thus, according to the above-mentioned arrangement, with the rise of temperature caused by a laser beam projection during a readout operation, the coercive force of the reproducing layer gradually decreases, whereas the saturation magnetization of the recording layer increases. Accordingly, when the leakage magnetic field induced in the reproducing layer by the recording layer exceeds the coercive force of the reproducing layer, the magnetization direction of the recording layer is copied to the reproducing layer by means of the leakage magnetic field from the recording layer. Since the change of the magnetization direction in accordance with temperature change is abrupt, the waveform of a reproducing signal thus obtained in a reading-out operation is made very abrupt.

Furthermore, the beam spot portion, on the reproducing layer, irradiated by the laser beam has such a temperature distribution that the temperature becomes higher from the peripheral part towards the central part. Accordingly, when the laser beam is arranged so that the temperature of the beam spot portion irradiated by the laser beam partially rises up to the readout temperature, information corresponding to only the readout-temperature part of the beam spot portion can be read out from the recording layer by the intermediary of the reproducing layer due to the projection of the laser beam.

In addition, with the foregoing arrangement, when detecting the magnetization direction of the reproducing layer to which the magnetization has been copied from the recording layer due to a temperature rise in response to the laser beam projection, even if a portion adjacent to the readout-temperature part on the reproducing layer falls in the beam spot together, it is possible to avoid the affection of the magnetization direction of such a portion.

To be more specific, the magnetization of the portion on the reproducing layer whose temperature is below the readout temperature in response to the laser beam projection is initialized by the initializing layer so as to direct in one specific direction. Therefore, with the arrangement, a disorder in the magnetization directions is avoided in the region which the spot of the laser beam falls on.

In short, the foregoing arrangement ensures to avoid the affection of magnetization directions of the reproducing layer in the tracks adjacent to the target track scanned by the laser beam, and causes the magnetization direction of the recording layer to be copied to the reproducing layer when the leakage magnetic field induced in the reproducing layer by the recording layer exceeds the coercive force of the reproducing layer. This causes the waveform of the reproducing signal thus readout to be abrupt.

Thus, with the arrangement as described hitherto, since only the high-temperature part in the beam spot portion is concerned with the reproduction, it is possible to reduce the size of each mark as a unit of the recording region of the recording layer, to shorten the mark pitch, and to decrease the interval between tracks, thereby ensuring the improvement of the information recording density of the recording layer compared with FAD. Furthermore, the arrangement, even without an external magnetic field such as a reproduction-use magnet and an initialization-use magnet as is the case with RAD, ensures that only information recorded on a portion, of the recording layer, which is heated to the readout temperature due to the projection of the laser beam is copied to the reproducing layer, thereby ensuring the stable reproduction.

Therefore, with the foregoing arrangement, since the recording densification required to obtain mass storage is achieved enough, such information as image information can be recorded without an external magnetic field, although the recording of such information conventionally requires a recording and reproducing device with an enormous capacity. Also, since omitting an external magnetic field, the arrangement can prevent the recording-reproducing device from becoming large in size.

A second magneto-optical recording medium in accordance with the present invention, having the same configurations as the first magneto-optical recording medium, has the following properties. The reproducing layer has a compensation temperature below room temperature. The recording layer has a compensation temperature of room temperature. The initializing layer, which is previously initialized so that its magnetization directs in one specific direction, has a compensation temperature falling in a range between room temperature and a Curie temperature of the recording layer, and has a Curie temperature above a Curie temperature of the reproducing layer.

According to the arrangement described above, since the compensation temperature of the reproducing layer is set lower than room temperature, the coercive force of the reproducing layer gradually decreases as temperature rises from room temperature to the readout temperature. Additionally, a reversion of the saturation magnetization direction, which occurs on passing over the compensation temperature, by no means occurs to the reproducing layer in the above temperature range. Therefore, at room temperature the reproducing layer is stably initialized by the initializing layer, while the magnetization direction of the recording layer is stably copied to the reproducing layer at the readout temperature.

Moreover, the foregoing arrangement sets the compensation temperature of the recording layer to room temperature, thereby reducing the saturation magnetization of the recording layer to substantially zero at room temperature. Accordingly, the recording layer's affection on the initializing layer's initialization of the reproducing layer can be restrained, in a temperature range of not less than room temperature and of less than the readout temperature.

Additionally, the foregoing arrangement sets the compensation temperature of the initializing layer to a temperature falling in a range between room temperature and the Curie temperature of the recording layer, thereby enabling to reduce the saturation magnetization of the initialization layer in the vicinity of the readout temperature, the readout temperature falling in the temperature range between room temperature and the Curie temperature of the recording layer. Therefore, it is possible to restrain the initializing layer's affection on the copying from the recording layer to the reproducing layer at the readout temperature.

Furthermore, the foregoing arrangement sets the Curie temperature of the initializing layer higher than the Curie temperature of the reproducing layer, thereby allowing the magnetization direction of the initializing layer to be maintained even at the readout temperature which is set lower than the Curie temperature of the reproducing layer. Therefore, the magnetization direction of the initializing layer is stabilized, thereby resulting in that the reproducing layer can be stably initialized by the initializing layer.

Thus, the foregoing arrangement ensures a more stable readout of information from the reproducing layer.

A third magneto-optical recording medium in accordance with the present invention, having the same configurations as the first magneto-optical recording medium, is characterized in that the initializing layer has a compensation temperature of about the readout temperature.

With the above-mentioned arrangement, the saturation magnetization of the initializing layer is substantially zero at the readout temperature since the compensation temperature of the initialization layer is set in the vicinity of the readout temperature. Therefore, it is possible to avoid the initializing layer's affection on the copying from the recording layer to the reproducing layer at the readout temperature. Thus, the foregoing arrangement ensures such a copying to be more stable, thereby ensuring the readout of information from the reproducing layer to be more stable.

A first method of the present invention for reproducing the magneto-optical recording medium comprises the steps of (1) preparing the first magneto-optical recording medium, (2) projecting a laser beam on the reproducing layer, thereby forming a beam spot on which the laser beam is converged, and (3) reading out a reproducing signal for reproducing of information from the reproducing layer upon temperature rising of a portion irradiated by the laser beam up to the readout temperature.

The described method, using the first magneto-optical recording medium, enables only a part of the beam spot portion to be heated to the readout temperature, thereby allowing a reproducing signal for reproducing information to be stably read out from the above-mentioned part of the irradiated portion of the reproducing layer. Therefore, the recording density of the recording layer is enhanced, while the bulking up of a reproducing device is avoided by omitting an external magnetic field for reproduction.

A second method of the present invention of reproducing from a magneto-optical recording medium, comprising the same steps of the first method, further comprises the step of differentiating the reproducing signal, and reproducing information in accordance with a signal obtained by the differentiating.

The foregoing method, using the first magneto-optical recording medium, allows a reproducing signal to have a abrupt waveform, but with the above-mentioned step of differentiating the obtained reproducing signal, a signal having an abrupter waveform and being less affected by drift can be obtained. Thus, stable reproduction of information is achieved using a simple circuit for differentiating.

For a fuller understanding of the nature and advantages of the invention, reference should be made to the ensuing detailed description taken in conjunction with the accompanying drawings.

BRIEF DESCRIPTION OF THE DRAWINGS

FIGS. 3(a) and 3(b) are explanatory views showing the magneto-optical recording medium and a method of reproducing from the same in accordance with the present invention, wherein

DESCRIPTION OF THE PREFERRED EMBODIMENTS

First Embodiment

The following description will discuss one embodiment of the present invention with reference to FIGS. 1 through 6.

Figure 1:
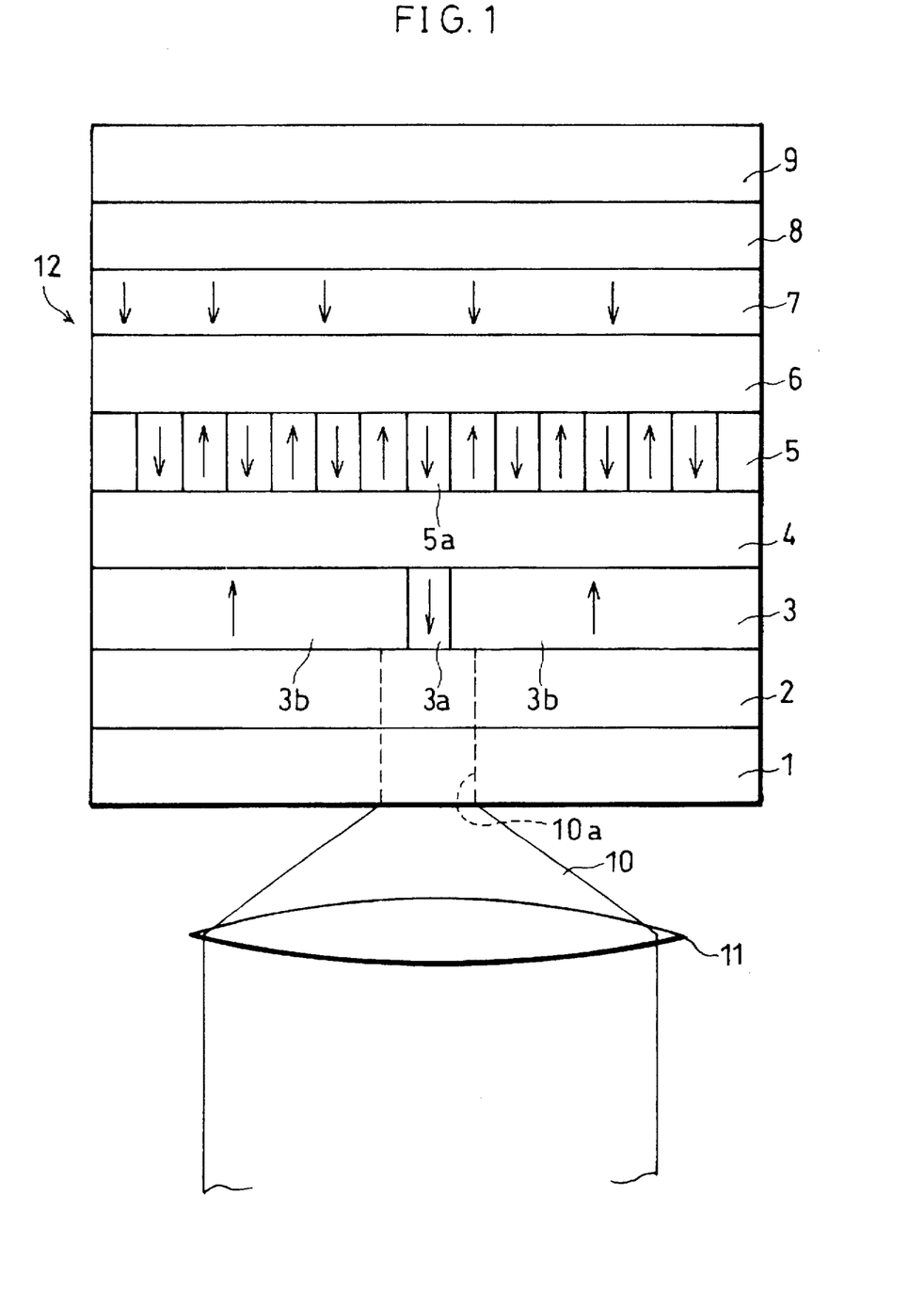
FIG. 1 is a schematic view showing an arrangement of a magneto-optical recording medium in accordance with the present invention.

A magneto-optical recording medium of the present embodiment has a disk main body 12. On the disk main body 12, a substrate 1, a transparent dielectric layer 2, a reproducing layer 3, a non-magnetic layer 4, a recording layer 5, a non-magnetic layer 6, an initializing layer 7, a protective layer 8, and an overcoat layer 9 are laminated in this order, as shown in FIG. 1. The substrate 1 is made of a transparent material such as polycarbonate, and is provided in a disk shape.

Such a magneto-optical recording medium adopts the recording system based on Curie temperature. Namely, a light beam 10 (laser beam from a semiconductor, etc.) is converged onto a reproducing layer 3 by an objective lens 11, and information is reproduced from the reproducing layer 3 utilizing the magneto-optical effect known as the polar Kerr effect.

In FIG. 1, the arrows shown in the reproducing layer 3, the recording layer 5, and the initializing layer 7 indicate of the transition-metal sub-lattice magnetization direction of the rare earth-transition metal amorphous alloy.

Figure 3A:
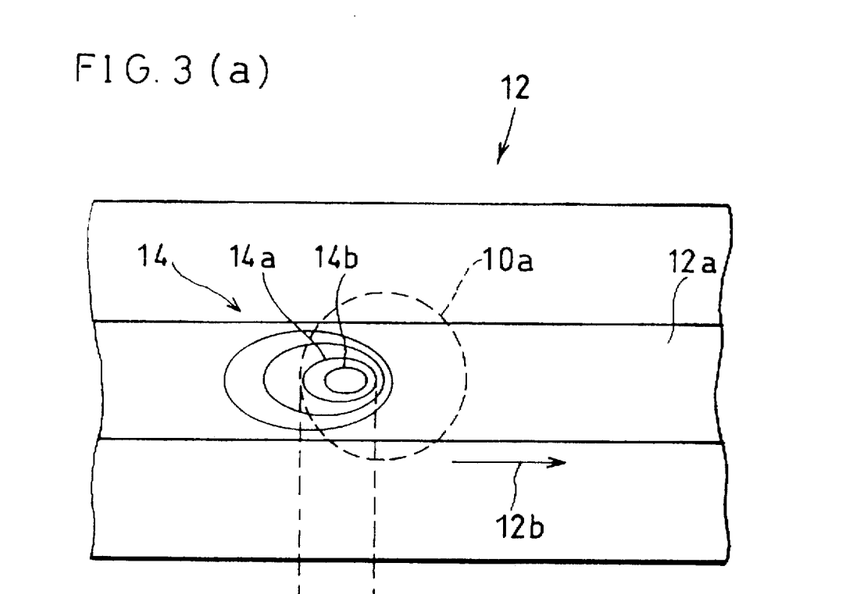
FIG. 3(a) is a schematic plan view and FIG. 3(b) is a cross-sectional view showing a schematic configuration.
Figure 3B:
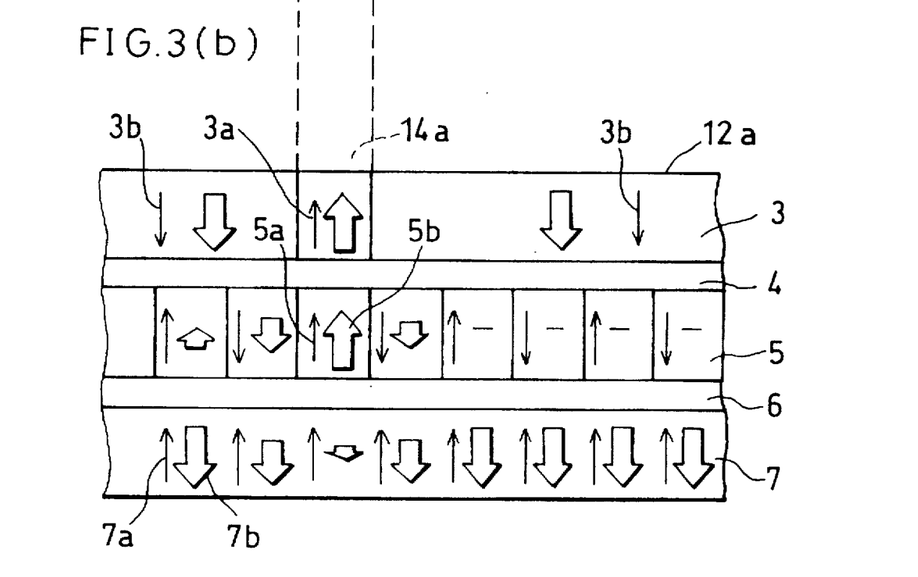

An instantaneous transcription or initialization of a magnetic domain is carried out in the above-mentioned magneto-optical recording medium, by controlling the magnetization direction of the reproducing layer 3 in accordance with the temperature distribution caused on the reproducing layer 3 by the light beam 10 converged thereon (see FIGS. 3(a) and 3(b)). Specifically, a portion (3a) of a spot irradiated by the light beam 10 is heated to or above a readout temperature, and the magnetization of the portion (3a) thus heated to such a high temperature on the reproducing layer 3 is directed in the direction of a leakage magnetic field, which is caused by leakage magnetic flux generated from a magnetic domain (5a) in the recording layer 5. On the other hand, the magnetization of the other portions (3b) on the reproducing layer 3, whose temperature is not lower than room temperature and below the readout temperature is directed in the direction of a leakage magnetic field caused by leakage magnetic flux generated from the initializing layer 7.

As a result, even information recorded in the recording layer 5 at a pitch shorter than the diameter of the light beam 10 can be stably reproduced through the intermediary of the reproducing layer 3.

Figure 2:
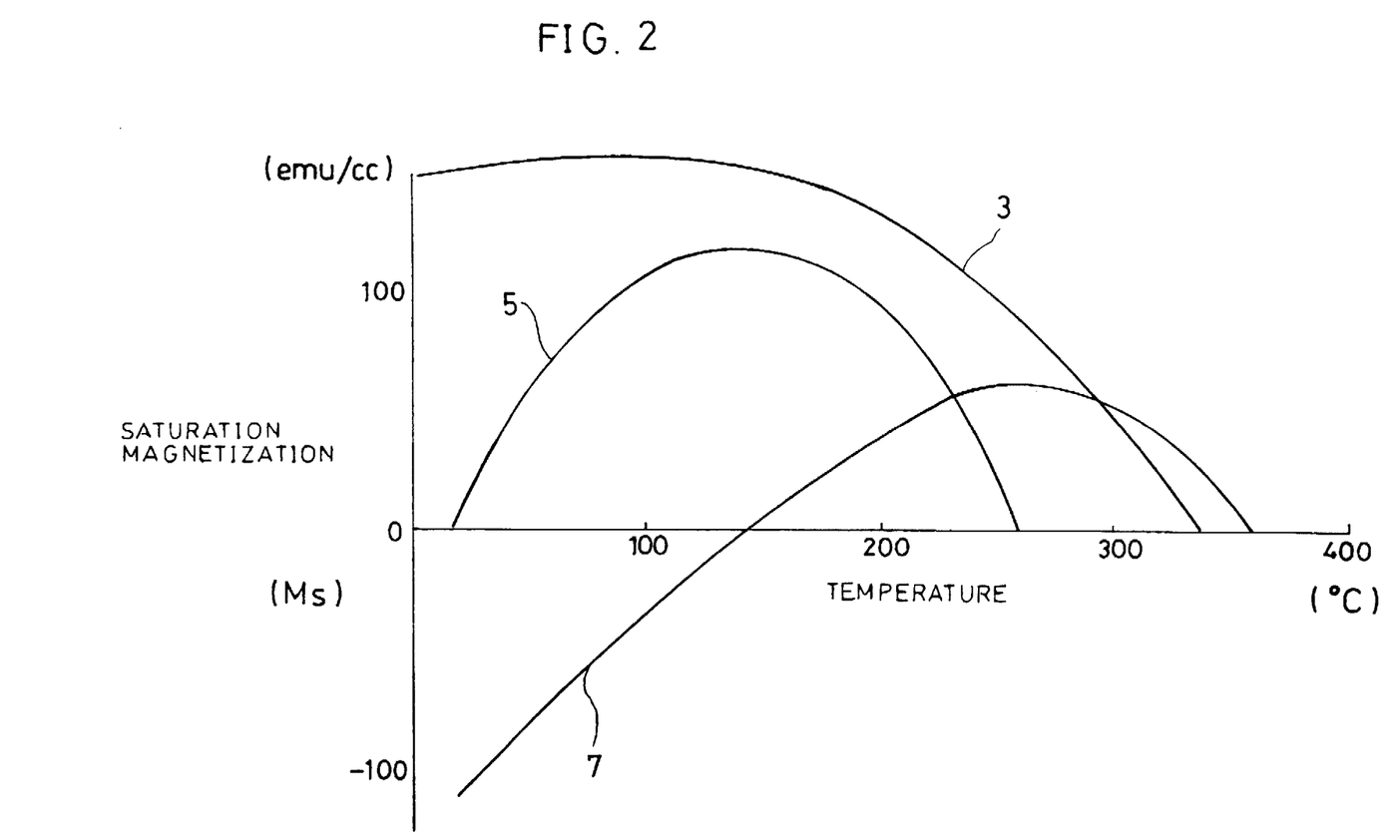
FIG. 2 is a graph showing magnetic characteristics of the respective saturation magnetizations of the reproducing, recording, and initializing layers of the magneto-optical recording medium.

The following description will explain the magneto-optical recording medium in detail referring to FIGS. 2 and 3. FIG. 2 illustrates the temperature dependence of the respective saturation magnetizations (Ms) of the reproducing layer 3, the recording layer 5, and the initializing layer 7. Each of the reproducing, recording and initializing layers 3, 5, and 7 is made of a rare earth-transition metal amorphous alloy having a ferrimagnetism.

In such a rare earth-transition metal amorphous alloy, sub-lattice magnetizations of a rare-earth metal and a transition metal are anti-parallel to each other. When the sub-lattice magnetizations of the respective metals are equal, the saturation magnetization, i.e., the sum of the respective sub-lattice magnetizations, becomes zero. A temperature at which such a state is realized is called a compensation temperature, while a composition with which such a state is realized is called a compensation composition.

At a temperature below the compensation temperature, such a rare earth-transition metal amorphous alloy has a saturation magnetization directed in the sub-lattice magnetization direction of the rare-earth metal, since the sub-lattice magnetization of the rare-earth metal is greater than that of the transition metal. On the other hand, at a temperature above the compensation temperature, the rare earth-transition metal amorphous alloy has a saturation magnetization directed in the sub-lattice magnetization direction of the transition metal, since the sub-lattice magnetization of the rare-earth metal is smaller than that of the transition metal.

Hereinafter the state where the sub-lattice magnetization of a rare-earth metal is greater than that of a transition metal is referred to as rare-earth metal rich (RE-rich), while the state in the reverse case is referred to as transition metal rich (TM-rich). FIG. 2 illustrates the negative saturation magnetization in the RE-rich state while the positive saturation magnetization in the TM-rich state.

The reproducing layer 3 which is TM-rich at room temperature has a saturation magnetization of, for example, 150 (emu/cc) at room temperature and the Curie temperature of 340° C. The recording layer 5 has a compensation temperature coincident with room temperature, a saturation magnetization of, for example, 120 (emu/cc) at 140° C., and a Curie temperature of 260° C. The initializing layer 7 which is RE-rich at room temperature has a saturation magnetization of, for example,—110 (emu/cc) at room temperature, a compensation temperature of 140° C., and a Curie temperature of 360° C. The initializing layer 7 is TM-rich in a temperature range of 140° C. to 360° C., with the maximum saturation magnetization in the TM-rich state of 60 (emu/cc) at 260° C.

The magneto-optical recording medium is rotated by a driving device (not shown) while the light beam 10 is projected on the reproducing layer 3 thereof, so that information is reproduced from the reproducing layer 3. Therefore, a beam spot 10a of the light beam 10 moves in the direction indicated by an arrow 12b, along a track 12a provided on the disk main body 12 in the circumferential direction.

With such a move of the beam spot 10a, a temperature distribution 14, depending on the moving speed of the beam spot 10a, occurs on the disk main body 12. Respective schematic elliptic lines showing the temperature distribution 14 are isothermal lines. Since the beam spot 10a moves with respect to the disk main body 12, the rear part of the beam spot 10a falls on the region which is heated highest in the disk main body 12. Here, in the temperature distribution 14, an isothermal line 14a shows 120° C., while an isothermal line 14b shows the highest temperature of 140° C. in this case.

FIG. 3(b) is a view of a cross section of the disk main body 12 in a thickness direction of the track 12a, illustrating the respective magnetizations when, as shown in FIG. 3(a), the light beam 10 is projected on the track 12a thereby forming the beam spot 10a thereon so as to carry out a readout operation. Note that the substrate 1, the transparent dielectric layer 2, the protective layer 8, and the overcoat layer 9 shown in FIG. 1 are omitted in the FIG. 3(b).

Thin arrows in FIG. 3(b) indicate respective directions of a sub-lattice magnetic moment of the transition metal (hereinafter referred to as TM magnetization) in the reproducing, recording, and initializing layers 3, 5, and 7. Since information is recorded in the form of the direction of the perpendicular magnetization in the recording layer 5, both arrows directed upward and downward which are anti-parallel to each other are alternately in the track direction shown to represent respective TM magnetizations. Arrows in the initializing layer 7 point to one specific direction (upward in the figure) since the layer's magnetization is previously directed in one direction when initialized.

In the reproducing layer 3, a TM magnetization 3a in a portion heated higher than the temperature of the isothermal line 14a (high-temperature portion) is directed upward in accordance with a TM magnetization 5a of a corresponding portion of the recording layer 5 which is provided below the reproducing layer 3. On the other hand, a TM magnetization 3b in the other portion (low-temperature portion) is directed downward. The reason why the reproducing layer 3 has such TM magnetizations as represented by the TM magnetizations 3a and 3b will be described later.

Voided arrows in FIG. 3(b) represent the directions and strengths of the saturation magnetizations of the reproducing, recording and initializing layers 3, 5, and 7, respectively. The initializing layer 7 has temperature dependence of saturation magnetization as illustrated in FIG. 2, and is RE-rich when temperature is below its compensation temperature of 140° C.

Therefore, a TM magnetization 7a and a saturation magnetization 7b of the initializing layer 7 are directed in the opposite directions each other when temperature is below 140° C. Therefore, the thin arrows and the voided arrows are anti-parallel, directed in the opposite directions each other. In the initializing layer 7, the saturation magnetization 7b is smaller (indicated by the strength of a voided arrow) in a portion closer to the high-temperature portion in the beam spot 10a, because the temperature is closer to the compensation temperature as the portion is closer to the high-temperature portion.

The following description will depict the saturation magnetization of the recording layer 5. Since the saturation magnetization of the recording layer 5 has temperature dependence as presented in FIG. 2, the recording layer 5 has the TM magnetization and the saturation magnetization directed in the same direction. This explains the state of the recording layer 5 in FIG. 3(b), where the TM magnetization 5a and the saturation magnetization 5b are directed in the same direction. In the recording layer 5, the saturation magnetization (indicated by voided arrows) is greater in a portion closer to the high-temperature portion heated to the readout temperature, while having the saturation magnetization of substantially zero in a portion having room temperature.

Incidentally, the saturation magnetization is defined as a magnetic moment per a unit volume which can be described in the form of a vector directed from S-pole to N-pole. Therefore, magnetic flux corresponding to the strength of the saturation magnetization is generated, thereby forming a magnetic field therearound.

The following description will discuss a magnetic field induced in a high-temperature portion (a portion heated higher than the temperature of the isothermal line 14a) in the reproducing layer 3. Since in the recording layer 5 a portion which comes just below the high-temperature portion has a saturation magnetization of a greater strength, a magnetic field induced in the high-temperature portion of the reproducing layer 3 by the recording layer 5 becomes great. In contrast, in the initializing layer 7, a portion which comes below the high-temperature portion has a saturation magnetization of a very small strength or substantially zero. Therefore, a magnetic field, induced by such a portion of the initializing layer 7, in the high-temperature portion of the reproducing layer 3 becomes extremely small. Accordingly, the magnetic field formed in the high-temperature portion of the reproducing layer 3 is in accordance with the information recorded in the recording layer 5.

The following description will discuss a magnetic field induced in a low-temperature portion (a portion heated lower than the temperature of the isothermal line 14a). While a portion of the recording layer 5 which comes just below the low-temperature portion has a saturation magnetization of small strength or substantially zero, a portion of the initializing layer 7 corresponding to the low-temperature portion has a saturation magnetization with a great strength. Therefore, the magnetic field induced in the low-temperature portion of the reproducing layer 3 is in accordance with the information in the initializing layer 7.

When information is recorded in the recording layer 5 with the magnetization direction, the magnetization of the initializing layer 7 is previously directed in one specific direction. Therefore, when the magnetization direction of the reproducing layer 3 changes in accordance with a magnetic field caused by other layers, information in the recording layer 5 is copied only to the high-temperature portion in the reproducing layer 3, whereas the low-temperature portion shows the magnetization having one specific direction in accordance with the initializing layer 7.

Thus, information recorded in the recording layer 5 is read out only from the region inside the isothermal line 14a in the beam spot 10a (see FIG. 3(a)) through the intermediary of the reproducing layer 3, whereas the other region of the reproducing layer 3 has a magnetization always directed in one direction in accordance with the initializing layer 7.

As has been described, the magnetization direction of the reproducing layer 3 changes in accordance with a magnetic field from the recording layer 5 and the initializing layer 7, provided that the magnetic field, induced in the reproducing layer 3 by the recording layer 5 and the initializing layer 7, is greater than the coercive force of the reproducing layer 3 at the readout temperature or room temperature. In this case, the magnetization of the reproducing layer 3 is initialized in accordance with the initializing layer 7 in a low-temperature portion having a temperature of not lower than room temperature and of below the readout temperature. On the other hand, in the high-temperature portion, heated at or above the readout temperature, of the reproducing layer 3, the magnetization direction is changed in accordance with the magnetization direction of the recording layer 5 representing information.

Therefore, the arrangement of the present embodiment allows the size of a region of the recording layer 5 from which information is reproduced to be smaller than the size of the beam spot 10a of the light beam 10. This enables the reading out of information to be carried out with enhanced resolution which is beyond the diffraction limit of the light beam 10. Accordingly, the foregoing arrangement can improve the recording density, since enabling the reading-out to be carried out with higher resolution than the conventional arrangement does. Furthermore, the foregoing arrangement can also prevent a reproducing device from becoming large in size, since an external magnetic field for initializing the reproducing layer 3 and an external magnetic field for reproduction-use can be eliminated.

A concrete example of a magneto-optical recording medium of the present embodiment is shown below.

In a sputtering device provided with targets of Al, GdFeCo alloy, DyFeCo alloy, and TbFeCo alloy, a substrate 1 was placed on a substrate holder. The substrate 1 was made of polycarbonate and was formed in a disk shape provided with pregrooves and prepits. The sputtering device was evacuated to $1 \times 10^{-6}$ Torr, and mixed gas of argon and nitrogen was introduced. Then, the Al target was supplied with electric power, and a transparent dielectric layer 2 made of AlN was formed on the substrate 1 under the gas pressure of $4 \times 10^{-3}$ Torr.

Here, in order to achieve improved reproducing characteristics, the transparent dielectric layer 2 was set to have a thickness equal to around a value obtained by dividing one forth of the wave length of the reproducing light of the light beam 10 by the refractive index of the transparent dielectric layer 2. For example, when a reproducing light beam with a wave length of 680 nm is used, the thickness may be set to 10 nm–80 nm. In the present embodiment, the transparent dielectric layer 2 with a thickness of 50 nm was adopted.

Then, the sputtering device was again evacuated to $1 \times 10^{-6}$ Torr, and argon gas was introduced. Then, the GdFeCo alloy target was supplied with electric power, and under the gas pressure of $4 \times 10^{-3}$ Torr, a reproducing layer 3 made of $Gd_{0.18}(Fe_{0.66}CO_{0.34})_{0.82}$ was formed on the transparent dielectric layer 2. The reproducing layer 3 always contains more proportion of transition metal than that in a compensation composition, thereby being TM rich. The reproducing layer 3 had a Curie temperature of 340° C.

The reproducing layer 3 preferably has a thickness of not less than 10 nm, since with such a thickness, the reproducing layer can, to some extent, avoid that the reproducing signal includes information reproduced from the recording layer 5 when the light beam 10 transmits the reproducing layer 3. If the reproducing layer 3 is too thick, a greater power of the light beam 10 is required for raising temperature, which causes the recording sensitivity to drop. Therefore, it is preferable that the reproducing layer 3 has a thickness of not more than 80 nm. In the present embodiment, the reproducing layer 3 with a thickness of 20 nm was adopted.

Then, a mixed gas of argon and nitrogen was introduced in the sputtering device. The Al target was supplied with electric power, and a non-magnetic layer 4 made of AlN was formed on the reproducing layer 3, under the gas pressure of $4 \times 10^{-3}$ Torr. Here, it is preferable that the non-magnetic layer 4 has a thickness of not more than 60 nm, so that a greater magnetic field is induced in the reproducing layer 3 by the recording layer 5. Furthermore, it is preferable that the thickness is not less than 1 nm, so as to prevent exchange-coupling between the reproducing layer 3 and the recording layer 5. In the present embodiment, the non-magnetic layer 4 with a thickness of 5 nm was adopted.

In the next stage, the sputtering device was again evacuated to $1 \times 10^{-6}$ Torr, and Argon gas was introduced in the sputtering device. Then, the DyFeCo alloy target was supplied with electric power, and a recording layer 5 made of $Dy_{0.23}(Fe_{0.75}CO_{0.25})_{0.77}$ was formed on the non-magnetic layer 4, under the same conditions as those applied when forming the reproducing layer 3 made of a GdFeCo alloy. The recording layer 5 is a film with a perpendicular magnetization which has a compensation temperature of around room temperature and a Curie temperature of 260° C.

It is preferable that the recording layer 5 has a thickness of not less than 20 nm so as to induce a magnetic field required for reversing the magnetization of the reproducing layer 3. In addition, if the recording layer 5 is too thick, a greater power of the light beam 10 is required for raising temperature, which causes the recording sensitivity to drop. For the described reason, it is preferable that the thickness of the recording layer 5 is not more than 200 nm. In the present embodiment, the recording layer 5 with a thickness of 60 nm was adopted.

Then, a non-magnetic layer 6 made of AlN was formed on the recording layer 5, under the same conditions as the above-mentioned conditions applied when forming layers made of AlN. It is preferable that the non-magnetic layer 6 has a thickness of not more than 60 nm, so that a greater magnetic field is induced in the reproducing layer 3 by the initializing layer 7. Furthermore, it is preferable that the thickness of the non-magnetic layer 6 is not less than 1 nm so as to prevent exchange-coupling between the recording layer 5 and the initializing layer 7. In the present embodiment, the non-magnetic layer with a thickness of 5 nm was adopted.

In the following stage, the sputtering device was evacuated to $1 \times 10^{-6}$ Torr, and Argon gas was introduced. The TbFeCo alloy target was supplied with electric power, and an initializing layer 7 made of $Tb_{0.28}(Fe_{0.72}CO_{0.28})_{0.72}$ was formed on the non-magnetic layer 6, under the same conditions applied when forming the reproducing layer 3 made of a GdFeCo alloy. The initializing layer 7 is a film with a perpendicular magnetization which has a compensation temperature of 140° C. and a Curie temperature of 360° C.

It is preferable that the initializing layer 7 has a thickness of not less than 20 nm so that the initializing layer 7 can induce a magnetic field required for reversing the magnetization of the reproducing layer 3. If the initializing layer 7 is too thick, a greater power of the light beam 10 is required for raising temperature, thereby causing the recording sensitivity to drop. Therefore, it is preferable that the initializing layer 7 has a thickness of not more than 200 nm. In the present embodiment, the initializing layer 7 with a thickness of 60 nm was adopted.

In the next stage, a mixed gas of argon and nitrogen was introduced to the sputtering device. The Al target was supplied with electric power, and a protective layer 8 made of AlN was formed on the initializing layer 7, under the same conditions applied when forming the transparent dielectric layer 2.

The thickness of the protective layer 8 is not limited provided that the recording layers such as the recording layer 5 can be protected from corrosion due to oxidization, etc. It is preferable that the thickness of the protective layer is not less than 5 nm. In the present embodiment, the protective layer 8 with a thickness of 20 nm was adopted.

Finally, an overcoat layer 9 was formed on the protective layer 8. The overcoat layer 9 was formed as follows. An ultraviolet ray hardening resin or a thermal hardening resin was applied by the spin-coating method. Then, a projection of the ultraviolet ray or an application of heat was carried out.

Figure 4:
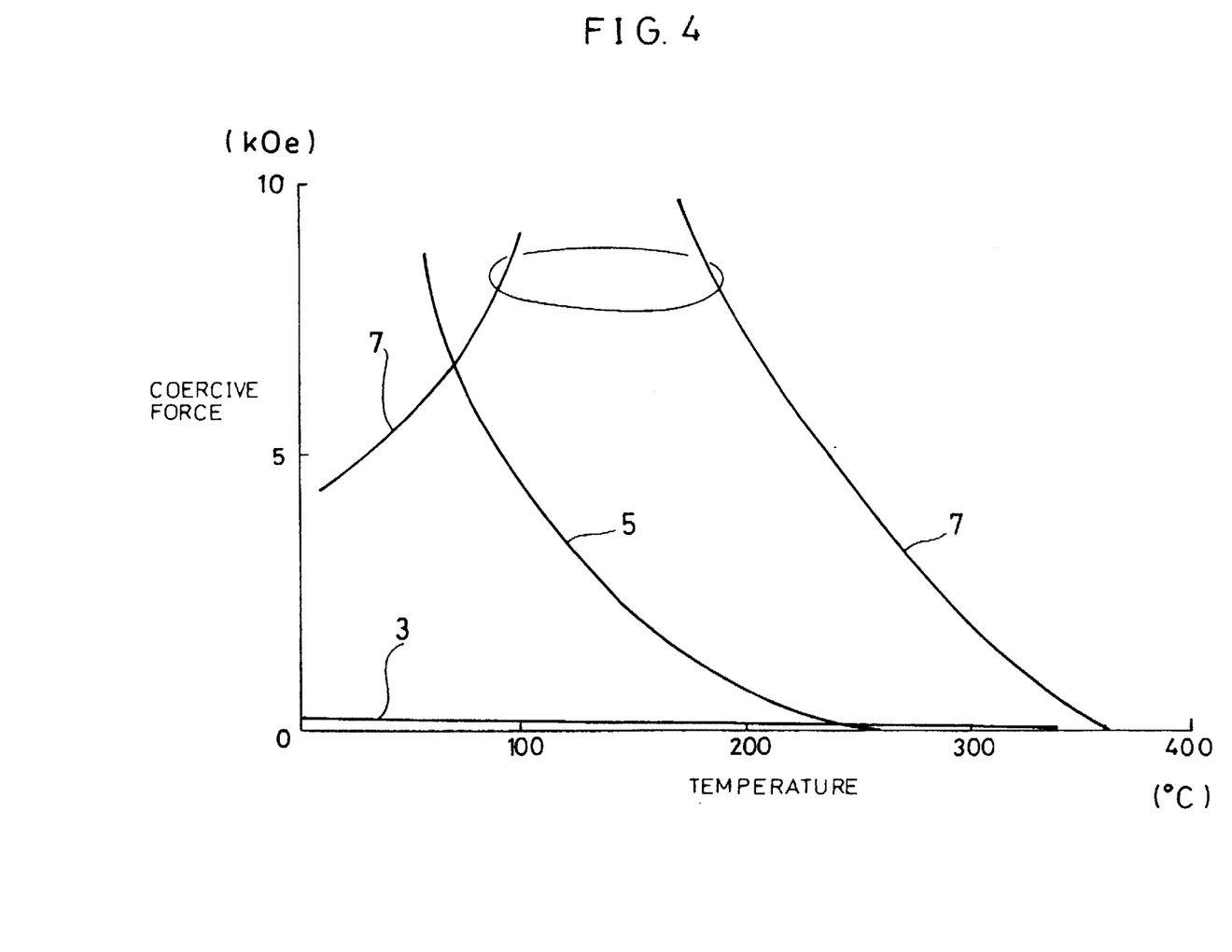
FIG. 4 is a graph showing temperature dependence of the respective coercive force of the reproducing, recording, and initializing layers of the magneto-optical recording medium.

The temperature dependence of the respective coercive forces of the reproducing layer 3, the recording layer 5, and the initializing layer 7 is presented in FIG. 4. Specifically, in a temperature range between room temperature and the highest readout temperature of 160° C., the reproducing layer 3 with a perpendicular magnetization has a coercive force small enough for the magnetization to direct in accordance with the magnetic field induced by the recording layer 5 and the initializing layer 7. The initializing layer 7 has a great coercive force of not less than 1.5 kOe at around a temperature of not higher than a recording temperature (in the vicinity of the Curie temperature of the recording layer 5), so that information is not recorded in the initializing layer 7 during a recording operation.

Figure 5:
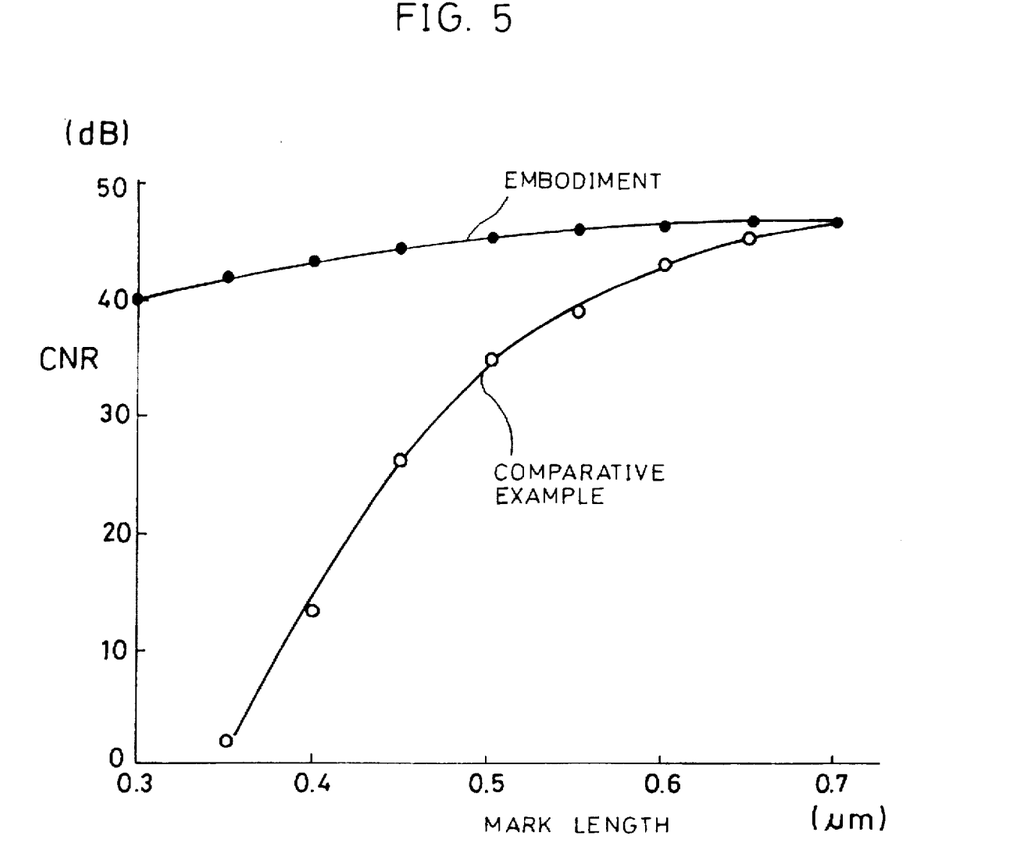
FIG. 5 is a graph showing a mark length dependence of the reproducing characteristics of the magneto-optical recording medium.

The recording and reproducing characteristics were measured with respect to the magneto-optical recording medium prepared in the present embodiment (see FIG. 5). FIG. 5 illustrates the mark length dependence of the carrier-to-noise ratio (hereinafter referred to as CNR) of the magneto-optical recording medium of the present embodiment. The measurement was carried out at a linear velocity of 5 m/s. To begin with, the light beam 10 with a DC laser power of 8 mW was projected while a magnetic field of 3000 e was applied. Thus, the initializing layer 7 was initialized.

In the next stage, by projecting the light beam 10 with a pulse laser power of 6 mW while applying a recording magnetic field of 1500 e, recording bits with different mark lengths were formed. Each recording bit is formed at a pitch which has double the length of its mark length. Then, the CNR was measured with respect to the recording bits, while applying the light beam 10 with a laser power of 2 mW for reproduction use. As shown in FIG. 5, a CNR of 40 dB was obtained with respect to the recording bit with a mark length of 0.3 µm and a mark pitch of 0.6 µm.

For comparison, a measurement result of a conventional magneto-optical recording medium is also shown by another curved line in FIG. 5. The measurement was carried out with a reproduction-use laser power of 1 mW. The conventional magneto-optical recording medium had the following configuration: an AlN layer with a thickness of 80 nm, a DyFeCo layer with a thickness of 20 nm, an AlN layer with a thickness of 25 nm, and an AlNi layer with a thickness of 30 nm were laminated on a substrate in this order and an overcoat layer was provided on the AlNi layer. Namely, the conventional magneto-optical recording layer had a single magnetic layer made of a rare earth-transition metal alloy, i.e., the DyFeCo layer. The DyFeCo layer was provided between the AlN layers serving as transparent dielectric layers as well as protective layers, and the AlNi layer serving as a reflection layer was provided on the top.

Such a configuration is called a reflection film structure, typical of a magneto-optical disk utilizing a single 3.5-inch substrate, which is already marketed. The reason why the conventional magneto-optical disk has a low CNR when a recording bit is short is that the number of bits falling within the spot of the light beam 10 increases as the bit length decreases, thereby making it difficult to distinguish one bit from another.

As an index indicating the optical resolution of an optical pickup, the cut-off spacial frequency is well known, which is determined by the wave length of the laser as a light source and the numerical aperture of an objective lens. Using the wave length and the numerical aperture of the optical pickup employed in the present measurement (830 nm, 0.55, respectively), the cut-off frequency was found and converted into the length of a recording bit as follows: 830 nm/(2*0.55)/2=0.377 µm. In other words, the limitation bit length of the optical resolution of the optical pickup employed in the above measurement was 0.377 µm. Actually, in the measurement with respect to the above-mentioned conventional magneto-optical disk, the CNR was substantially zero when the bit length was 0.35 µm, which supports the limitation bit length of 0.377 µm.

Figure 6:
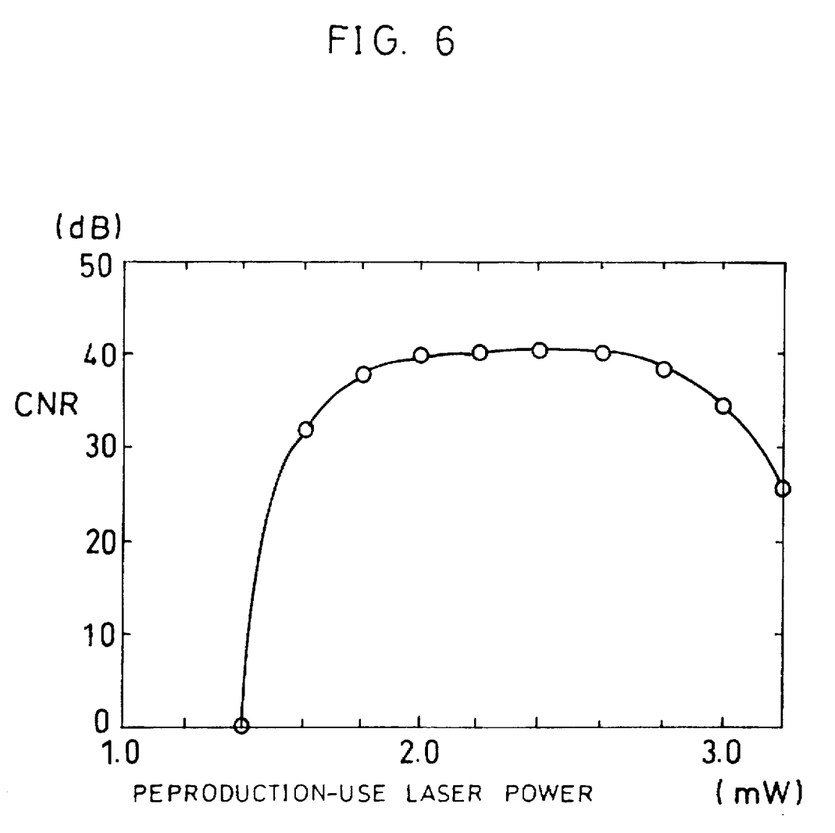
FIG. 6 is a graph showing a laser beam's reproducing power dependence of reproducing characteristics of the magneto-optical recording medium.

Another measurement was on the reproducing power dependence of the CNR, i.e., how the CNR changes when the reproduction power changes. The readout-use laser beam was projected on a recording bit with a mark length of 0.3 µm and a mark pitch of 0.6 µm, and the CNR was measured each time when the reproduction power of the laser was changed. The measurement result is shown in FIG. 6.

As to the magneto-optical recording medium of the present embodiment, it was found that after the reproduction power, gradually increased, had a threshold power, the CNR drastically increased. To be more specific, a temperature distribution shown in FIG. 3(a) appeared with the increase of the reproduction power, and an instantaneous appearance and disappearance of a magnetic domain, i.e., a superresolution phenomenon, happened to the reproducing layer 3 in accordance with the information in the recording layer 5, thereby causing such a drastic increase in the CNR. With the magneto-optical recording medium of the present embodiment, an improved signal can be thus obtained by appropriately setting the reproduction power, compared with the conventional one.

Second Embodiment

The following description will discuss an embodiment of a reproducing method with respect to the magneto-optical recording medium of the first embodiment, with reference to FIGS. 7 through 10.

Figure 7:
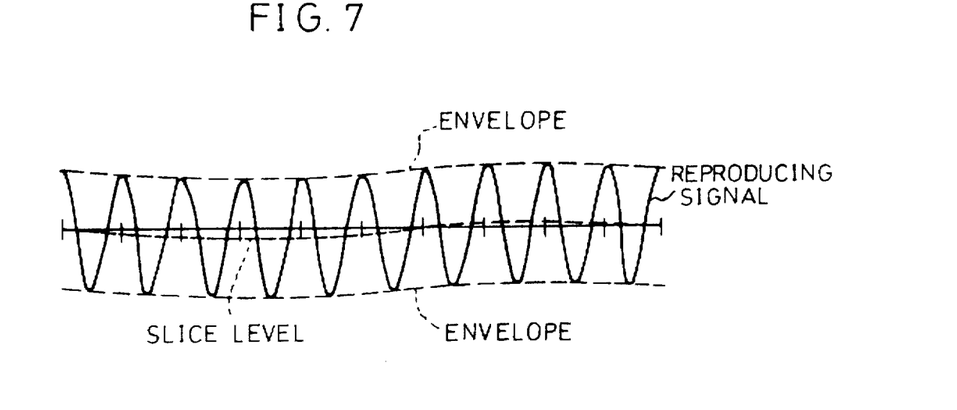
FIG. 7 is a graph showing a reproducing signal of a conventional magneto-optical recording medium.

FIG. 7 illustrates an example reproducing signal waveform obtained from recording bits with a mark pitch of 0.8 µm and a mark length of 0.4 µm, which are recorded on a widely-used conventional single-layered magneto-optical recording medium. As the light beam moves on the recording bits, a reproducing signal is obtained in a substantially sinusoidal manner.

Figure 8:
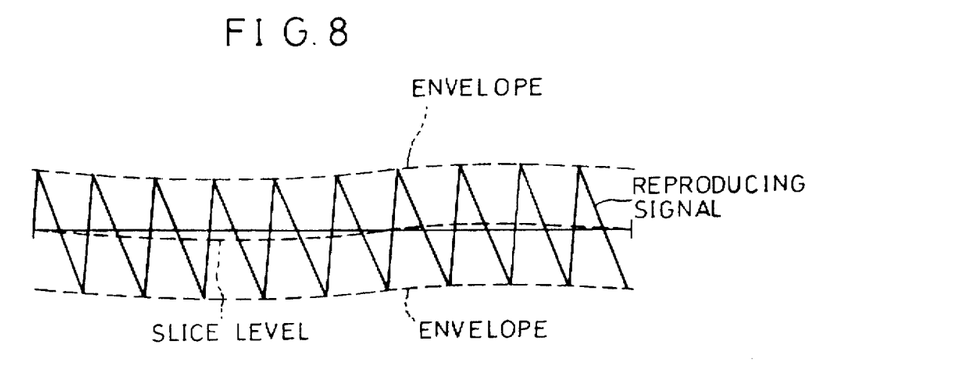
FIG. 8 is a graph showing a reproducing signal of the magneto-optical recording medium of the present invention.

FIG. 8 illustrates a waveform of the reproducing signal obtained from recording bits with a mark pitch of 0.8 µm and a mark length of 0.4 µm, which are recorded on a magneto-optical recording medium in accordance with the present invention. As shown in FIG. 8, in the case with the magneto-optical recording medium of the present invention, the rise of the reproducing signal is very abrupt.

Since the differential detection method is usually applied with respect to a magneto-optical recording medium, fluctuations, in the amplitude of the obtained reproducing signal, due to changes in the reflectance are restrained to some extent. However, such a reproducing signal contains fluctuations in the amplitude due to the birefringence, etc, which can not be restrained by the differential detection. Therefore, the amplitude of the reproducing signal slightly fluctuates (see FIG. 7). In such a state, if a constant voltage level is utilized as a slice level, it is impossible to detect the accurate position of each recording bit due to such a slight fluctuation of the signal amplitude.

In order to restrain such a reproduction error caused by the fluctuation of the signal amplitude, widely conducted is to obtain a target signal by envelope detecting. Specifically, envelopes of the reproducing signal are detected, and a slice level is set in accordance with the mean level of the obtained envelopes. Accordingly, it is enabled to prevent the detection of the position of the recording bit from being affected by the foregoing slight fluctuation of the signal amplitude, thereby allowing the detected position of the recording bit to be more accurate.

The amplitude of the reproducing signal of the magneto-optical recording medium of the present invention, shown in FIG. 8, also shows a slight fluctuation. Since the rise of the reproducing signal obtained from the magneto-optical recording medium of the present invention is abrupter than that from the conventional one shown in FIG. 7, it is possible to detect a more accurate position of the recording bit from the magneto-optical recording medium of the present invention than from the conventional one, even when the slicing is carried out using a constant voltage level. However, it is more preferable to detect envelopes of the reproducing signal (see FIG. 7) so as to obtain a target signal.

Figure 9:
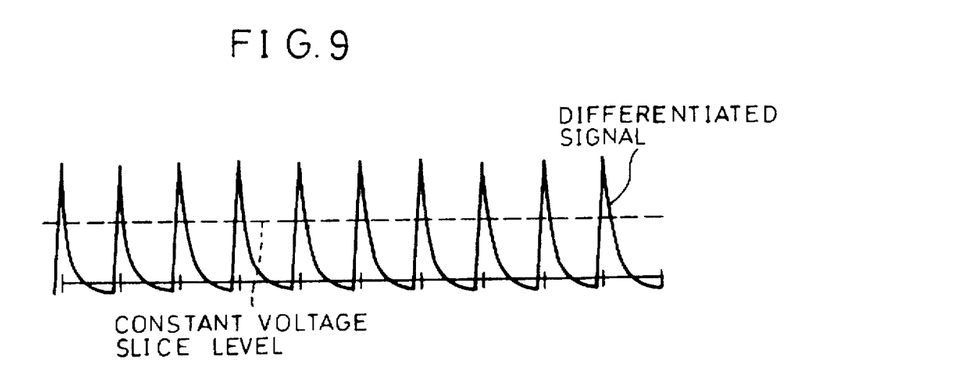
FIG. 9 is a graph showing a signal obtained by differentiating the reproducing signal.
Figure 10:
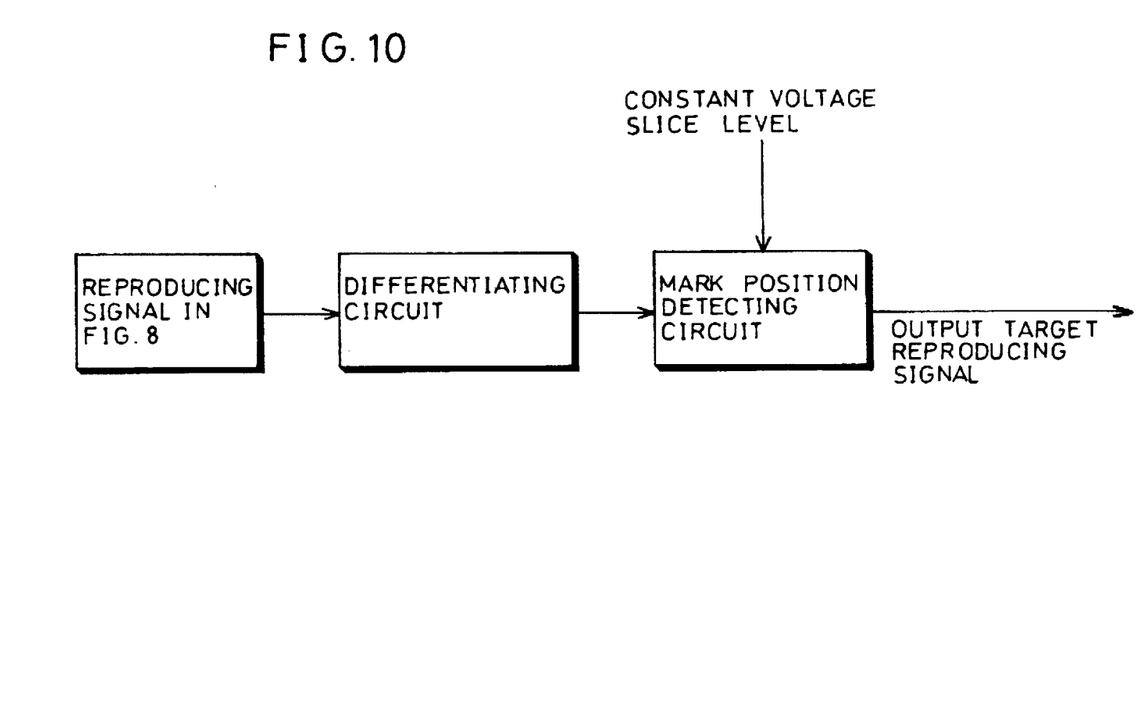
FIG. 10 is a block diagram showing a circuit for the differentiating.

The following description will explain a method for differentiating the reproducing signal so as to reproduce information. FIG. 9 illustrates a waveform of a signal, which is obtained by differentiating the reproducing signal from the magneto-optical recording medium of the present invention. Note that it is difficult to cause a drastic change in the waveform of a reproducing signal when the reproducing signal is in a sinusoidal form, as is in the conventional case (see FIG. 7). Such a differentiating only causes a change in the phase of the reproducing signal.

However, since the reproducing signal in the present embodiment has an extremely abrupt rise, it is possible to remove the adverse affection of the slight fluctuation in the reproducing signal by differentiating the reproducing signal (see FIG. 9). With such a technique, it is enabled to obtain as a differentiated output only the drastically changing part of the reproducing signal, that is, the rising part of the reproducing signal.

As has been described, in the present embodiment, by differentiating the obtained reproducing signal, it is enabled to remove the adverse affection of the slight fluctuation of the reproducing signal, thereby ensuring a target reproducing signal indicating the accurate position of the recording bit to be obtained. Accordingly, a delay circuit can be omitted, which is required for the conventional envelope detection. Instead of such a delay circuit, a simple circuit arrangement (see FIG. 10) utilizing a constant voltage slice level is alone required for appropriately dealing with the reproducing signal.

Furthermore, according to the method of the present embodiment for reproducing with respect to the magneto-optical recording medium, a reproducing signal is differentiated so that the slight fluctuation is removed from the reproducing signal. This makes an obtained signal have very abrupt rise and fall, thereby ensuring a detection of the rise and fall of the reproducing signal to be accurate. Therefore, preferable reproducing characteristics are obtained with respect to the recording method based on the mark length.

That it is possible to obtain the signal showing the accurate position of the recording bit edge by differentiating the reproducing signal, as described above, causes the following effect. The required quality of reproducing signal as a magneto-optical signal directly obtained from a medium can be lower.

Conventionally, when a reproducing signal before being processed has a CNR of 45 dB, it is impossible to restrain the error rate of not more than $1 \times 10^{-5}$, i.e., a requisite level for a magneto-optical disk. But, when a reproducing signal obtained from the magneto-optical recording medium in accordance with the present invention, which had a CNR of not less than 35 dB, was processed through the above-mentioned processing of the present invention, an error rate of not more than $1 \times 10^{-5}$ was obtained.

This indicates that an error rate can be restrained to an admissible level even when reproducing information recorded at high density such that an obtained CNR is no more than 35 dB, thereby achieving further high-density recording and reproducing. Table 1 shows the correlation between the recording bit length, the CNR, and the error rate (represented as Er). In the table, CNR1 and Er1 indicate the CNR and the error rate, respectively, of a reproducing signal obtained from the conventional magneto-optical recording medium shown in FIG. 7. CNR2 and Er2 indicate the CNR and the error rate, respectively, of a reproducing signal (see FIG. 8) obtained from the magneto-optical recording medium of the present invention. Er3, as shown in FIG. 9, indicates the error rate of a signal obtained by differentiating a reproducing signal obtained from the magneto-optical recording medium of the present invention.

TABLE 1

| BIT LENGTH (μm) | COMPARATIVE EXAMPLE | | EMBODIMENT | | |
|---|---|---|---|---|---|
| | CNR1 (dB) | Er1 (×10$^{-5}$) | CNR2 (dB) | Er2 (×10$^{-5}$) | Er3 (×10$^{-5}$) |
| 0.8 | 48 | 0.3 | 49 | 0.2 | 0.1 |
| 0.6 | 45 | 0.4 | 47 | 0.3 | 0.1 |
| 0.5 | 43 | 1.3 | 48 | 0.4 | 0.2 |
| 0.4 | 39 | 5.4 | 47 | 0.3 | 0.2 |
| 0.35 | — | — | 41 | 1.2 | 0.4 |
| 0.3 | — | — | 39 | 5.6 | 0.8 |
| 0.25 | — | — | 24 | 17.0 | 4.8 |

As indicated in Table 1, with regard to the comparative example having CNR1, a bit length of not less than 0.6 μm was required so that a preferable error rate (not more than $1 \times 10^{-5}$) was obtained (see the column of Er1 in Table 1). On the other hand, with regard to the present embodiment having CNR2, when the bit length was not less than 0.4 μm, a preferable error rate could be obtained even with respect to a reproducing signal which was not differentiated (see the column of Er2 in Table 1). This indicates a further densification can be achieved. Moreover, when the signal obtained by differentiating the reproducing signal is utilized, a bit length for obtaining a preferable error rate was not less than 0.35 mμ (see the column of Er3 in Table 1). This allows still further densification.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium comprising:
   a reproducing layer, a recording layer, and an initializing layer formed in this order on a transparent substrate, said reproducing, recording and initializing layers being made of respective magnetic substances, each magnetic substance being made of a rare earth-transition metal alloy having perpendicular magnetization;
   a first non-magnetic layer provided between said reproducing layer and said recording layer, said first non-magnetic layer being provided so as to intercept affection of an exchange-coupling force between said reproducing layer and said recording layer which are made of rare earth-transition metal alloys; and
   a second non-magnetic layer provided between said recording layer and said initializing layer, said second non-magnetic layer being provided so as to intercept affection of an exchange-coupling force exerted between said recording layer and said initializing layer which are made of rare earth-transition metal alloys,
   wherein said reproducing layer has a coercive force which is always smaller than a total leakage magnetic field induced in said reproducing layer, obtained by summing leakage magnetic fields from said recording layer and said initializing layer respectively in a temperature range between room temperature and a readout temperature, the readout temperature being obtained by projection of a laser beam on said reproducing layer so that information is read out from said reproducing layer in accordance with a direction of perpendicular magnetization;

said recording layer has a coercive force which is always greater than a total leakage magnetic field, induced in said recording layer, obtained by summing leakage magnetic fields from said reproducing layer and said initializing layer respectively in the above temperature range; and the respective leakage magnetic fields induced in said reproducing layer by said recording layer and by said initializing layer changes depending on respective saturation magnetizations of said recording layer and said initializing layer, the saturation magnetization changing in accordance with a temperature change, the leakage magnetic field from said initializing layer being greater than that from said recording layer in a temperature range from room temperature to the vicinity of the readout temperature, the magnetic field from said recording layer being greater than that from said initializing layer at the readout temperature.

2. The magneto-optical recording medium as set forth in claim 1, wherein:

said reproducing layer has a compensation temperature below room temperature;

said recording layer has a compensation temperature of room temperature; and said initializing layer has a compensation temperature falling in a range between room temperature and a Curie temperature of said recording layer, and has a Curie temperature above a Curie temperature of said reproducing layer, said initializing layer being previously initialized so that its magnetization directs in one specific direction.

3. The magneto-optical recording medium as set forth in claim 2, wherein the compensation temperature of said initializing layer is below the Curie temperature of said reproducing layer.

4. The magneto-optical recording medium as set forth in claim 2, wherein the Curie temperature of said initializing layer is above the Curie temperature of said recording layer.

5. The magneto-optical recording medium as set forth in claim 2, wherein the Curie temperature of said reproducing layer is above the Curie temperature of said recording layer.

6. The magneto-optical recording medium as set forth in claim 1, wherein said initializing layer has a compensation temperature of about the readout temperature.

7. A method for reproducing a magneto-optical recording medium as set forth in claim 1, comprising the steps of:

preparing the magneto-optical recording medium;

projecting a laser beam on the reproducing layer, thereby forming a beam spot on which the laser beam is converged; and reading out a reproducing signal for reproducing of information from the reproducing layer upon temperature rising of a part of the beam spot portion up to the readout temperature.

8. A method as set forth in claim 7, further comprising the step of differentiating the reproducing signal, and reproducing information in accordance with a signal thus obtained by the differentiating.

* * * * *